June 24, 1969     L. E. GLASGOW     3,451,359
CRUMB CRUST SHAPER
Filed Oct. 2, 1967
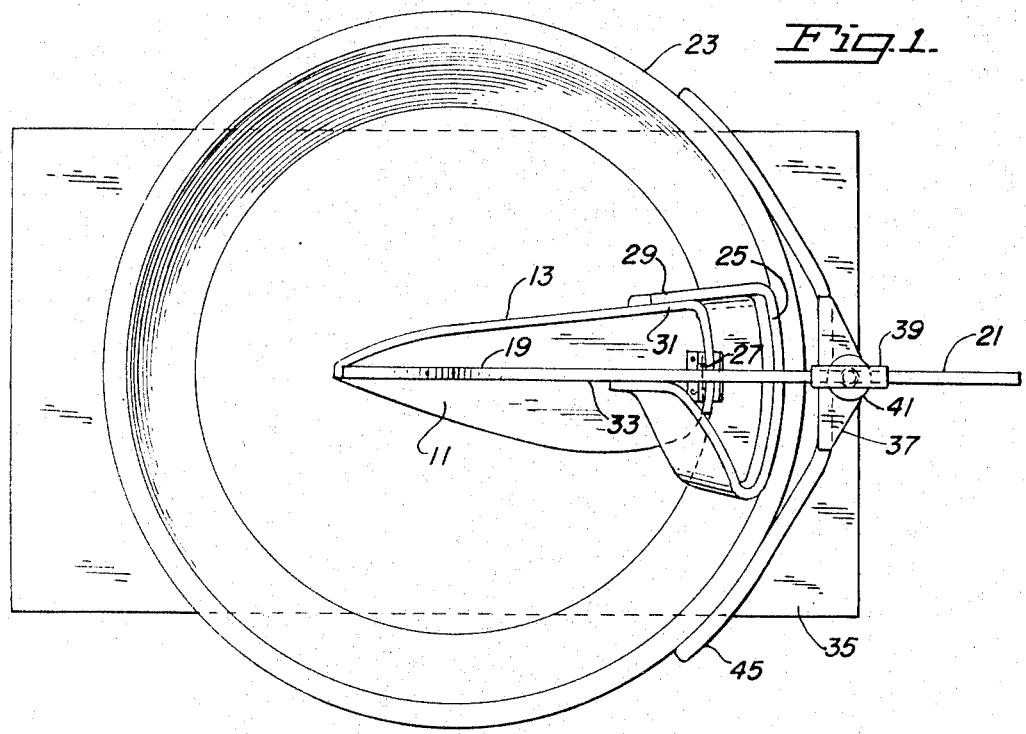
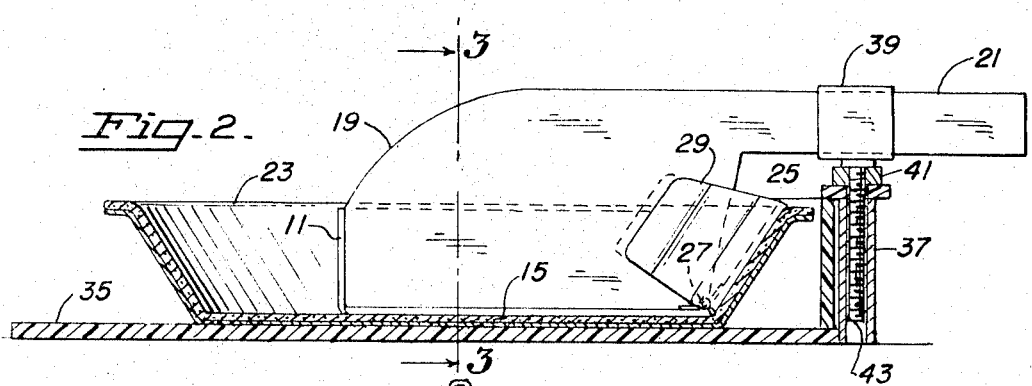
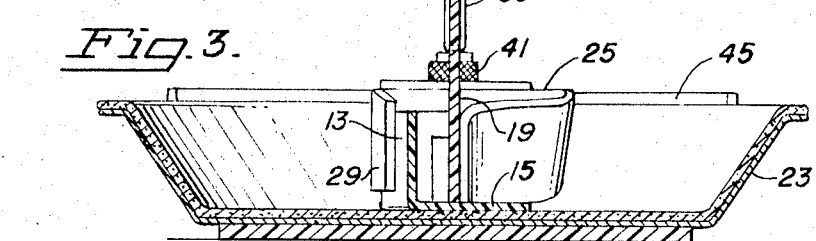
INVENTOR
LUTHER ELLIS GLASGOW
BY *Charles O. Bruce*
ATTORNEY

United States Patent Office 3,451,359
Patented June 24, 1969

3,451,359
CRUMB CRUST SHAPER
Luther Ellis Glasgow, 2122 Lakeshore Ave., Apt. 303, Oakland, Calif. 94606
Filed Oct. 2, 1967, Ser. No. 672,197
Int. Cl. A47j *43/20*
U.S. Cl. 107—47      11 Claims

ABSTRACT OF THE DISCLOSURE

A base for supporting a pan and a pair of adjustable interconnected shaping plates adjustably supported from the base within the pan to evenly spread crumb crust ingredients disposed in the pan when there is relative rotation of the plates with respect to the pan.

BACKGROUND OF THE INVENTION

Field of the invention

The present invention relates to pastry equipment and more particularly to a shaper and former for crumb crust baked or refrigerated goods.

Description of the prior art

There are many devices which have been made for the use in mass production of pie crusts and a few have been made particularly for crumb type pie crusts. Generally these latter devices utilize a multiplicity of formers which are simply a profile shaping plate which is rotated inside a baking pan to spread the crumb material around the pan. These units are usually driven in multiple unit arrangements for mass production and one too complicated and expensive to be used for making an individual crust. It is more feasible to make an individual crust by hand.

There is a need for a crumb crust shaper which is relatively inexpensive and can be used for making a uniform individual crumb crust quickly and easily.

SUMMARY OF THE INVENTION

The present invention is a crumb crust shaper for making individual crumb crusts in various sized and different type pans. It includes a lower shaping plate which can be positioned in a pan and supported relatively parallel the bottom of the pan.

A vertical adjustment means is provided for positioning the lower shaping plate at variable heights with respect to the bottom of a pan for producing different thicknesses of crusts.

A side wall shaping plate is provided which coacts with the lower shaping plate for shaping the crust on the sides of the pan.

An angular adjustment positioning means is provided for varying the angle of the side wall shaping plate with respect to the lower shaping plate to accommodate the different angles the sides of the pans make with the bottoms.

A guide means is provided for effecting relative rotation between the shaping plates and the pans within which the crusts are formed.

It is therefore an important object of the present invention to provide a relatively inexpensive crumb crust shaper which can be used to quickly and easily shape an individual crumb crust.

Another object of the present invention is to provide a crumb crust shaper which can be easily and quickly operated and produces a very uniform and well packed crust.

It is a further object of the present invention to provide a crumb crust shaper which will form a crust in any type of pan varying in depth between ½ and 4 inches and in diameter between 3 and 15 inches and when the angle formed by the sides of the pans ranges through an angle of 10 to 90 degrees with respect to the bottom of the pan.

An still another object of the present invention is to provide a crumb crust shaper which can be used for forming crumb crusts for pies, tarts, cakes, deep dish pies, and cupcakes.

DESCRIPTION OF THE DRAWINGS

FIGURE 1 is a top plan of a crumb crust shaper of the present invention with a pan;
FIGURE 2 is a side elevation of the present invention in partial section; and
FIGURE 3 is a front elevation in section taken along lines 3—3 of FIGURE 2.

DESCRIPTION OF THE PREFERRED EMBODIMENT

Reference is made to the drawings for a description of the preferred embodiment of the invention. Thereshown is a crumb crust shaper and former which comprises in part a lower shaping plate 11 having a generally vertical leading face 13 and a generally horizontal bottom face 15. The two faces of the lower shaping plate are interconnected.

A support plate 19 is secured to the lower shaping plate generally perpendicular to the bottom face. It is disposed rearward of the leading face and has a generally horizontally projecting arm 21 which extends laterally therefrom. Laterally in this context is a radial direction with respect to a pan 23 within which the lower shaping plate and sidewall shaping plate 25 form a crust.

The side wall shaping plate 25 is secured to the lower shaping plate by a hinge 27 which is disposed below the projecting arm of the support plate. The axis of the hinge is generally parallel a line tangent to the rim of the pan. The side wall shaping plate includes at least one wing 29 having a frictional contact surface 31 which engages the lower shaping plate and its support plate for maintaining the relative positioning of the side wall shaping plate with respect to the lower shaping plate. In the preferred embodiment, two wings are used. These wings are formed to bear against the leading face 13 of the lower shaping plate and the rear face 33 of the support plate with compressive downward spring pressure. The position of the wings in FIGURE 3 is shown rotated from the position of FIGURES 1 and 2.

A fixed base 35 is provided for supporting the shaping plates and has a mounting block 37 for a holder 39 which encircles and engages in slidable relation the projecting arm 21 of the support plate. The holder is provided with a screw means for adjusting the height thereof relative to the fixed base. The screw means includes a threaded collar 41 which bears against the upper surface of the mounting block and engages a threaded shaft 43 depending from the holder. Alternatively the hole in the base could be threaded and a threaded insert or sleeve disposed therein which can be raised or lowered with respect to the mounting block. Then the shaft on the holder can be made without threads and simply inserted in a bore in the sleeve.

The fixed base is provided with guide walls 45 which extend from the holder mounting block to cradle the edge of a pan 23 when it is placed upon the base. The pan can then be rotated by hand against the guide walls whereby fixed relative rotation of the pan with respect to to the holder is effected.

It is contemplated that the invention can be made from plastic components whereby it can be easily molded and assembled in production. The plastic is lightweight and strong, and it is easily cleaned.

The lower shaping plate 11 can be raised or lowered by operating the screw means supporting the holder. This varies the spacing of the lower shaping plate with respect to the fixed base and thereby permits varying the thickness of the crumb crust which is formed by the lower shaping plate in the bottom of the pan. Likewise the projecting arm of the support plate can slide in and out of the holder whereby the positioning of the side wall shaping plate with respect to the sides of the pan can be adjusted to vary the thickness of the crumb crust formed on the sides of the pan Likewise the side wall shaping plate 25 can be rotated around the axis of the hinge to conform to different angles utilized for the sides of different types of pans. This permits the shaper to accommodate every type of pan from deep dish straight sided cake pans to conventional pie pans.

It is obvious that the shaper can be made with a fixed position side wall shaping plate for use with pans having a fixed side wall angle. The side wall shaping plate in either embodiment has an angle of contact with the side wall of the pan which is less than 360°.

To use the present invention, the shaping plates are removed from the fixed base by lifting up on the holder. The holder can be removed from the fixed base since the threaded shaft is not threaded into the mounting block but simply fits within the bored hole provided in the fixed base. The pan is placed on the fixed base and pushed up against the guide walls. The crumb crust ingredients are placed in the bottom of the pan and then the shaping plates are positioned above the pan and the threaded shaft of the holder inserted into the mounting block. The threaded collar of the holder shaft is then adjusted to move the shaping plates with respect to the bottom of the pan whereby the thickness of the crumb crust is established. The side wall shaping plate is then rotated about its hinge until it parallels the wall of the pan. The shaping plates are then adjusted by sliding the projecting arm of the support plate within the holder until the side wall shaping plate is positioned proximate the edge of the pan at the desired thickness of the crumb crust. The pan is then rotated against the guide and the crumb crust material is automatically spread around the bottom of the pan and up the sides to form a smooth uniform crust.

The present invention has many advantages. The thickness of the crust produced is very uniform. The invention permits the thickness of the sides or the bottom of the crust to be varied thicker or thinner than the other. The invention eliminates waste of crumb crust material and permits accurate measurement of the amount of crust material used by quickly spreading the material across the bottom and up the sides of the pan and the excess spills over the top of the pan and can be retrieved for use in additional crusts. It takes approximately three to four revolutions of the pan to completely spread and form the crust which involves as little as five to ten seconds working time.

It will be apparent from the foregoing description of the invention, in its preferred form, that the crumb crust shaper will fulfill all the objects attributable thereto.

I claim:
1. A crumb crust shaper comprising
a lower shaping plate means,
vertical adjustment means for positioning said lower shaping plate at variable heights with respect to the bottom of a pan,
a side wall shaping plate means coacting with said lower shaping plate means,
angular adjustment and positioning means for varying the angle of said side wall shaping plate means with respect to said lower shaping plate means, and
guide means providing for relative rotation about a fixed axis between said shaping plate means and a pan.

2. The crumb crust shaper of claim 1 wherein said lower shaping plate means and said side wall shaping plate means are interconnected by a hinge forming a portion of said angular adjustment and positioning means.

3. The crumb crust shaper of claim 1 wherein said angular adjustment and positioning means includes frictional contact between said plate means for retaining said plate means in any set position relative to each other.

4. The crumb crust shaper of claim 1 wherein said guide means comprises a fixed base for said lower and side wall shaping plate means and a fixed guide enabling rotating of said pan in fixed relation to said shaping plate means.

5. The crumb crust shaper of claim 1 wherein said vertical adjustment means includes an adjustable height support for said lower shaping plate means.

6. The crumb crust shaper of claim 1 wherein said lower shaping plate means includes a leading face and a bottom face interconnected to said leading face, said lower shaping plate means having a projecting arm which extends up and over the edge of most common sized pans and engages said vertical adjustment means.

7. The crumb crust shaper of claim 6 wherein said side wall shaping plate means is hinged to said lower shaping plate means at the outer lateral end thereof and includes a projecting portion which bears against said lower shaping plate means with frictional force to maintain a set angular relationship between said side wall shaping plate means and the bottom face of said lower shaping plate means.

8. The crumb crust shaper of claim 6 wherein said projecting arm is supported by a holder slidable along said arm, said holder including screw means for adjusting the height thereof.

9. The crumb crust shaper of claim 8 wherein said holder is supported from a fixed base wherein said guide means includes a fixed guide extending from said holder to cradle the edge of a pan for rotation of a pan against said guide for fixed relative rotation with respect to said holder.

10. A crumb crust shaper comprising
a lower shaping plate having a generally vertical leading face and a generally horizontal bottom face interconnected to said leading face by a curved surface,
a support plate secured to said lower shaping plate means generally perpendicular to said bottom face and having a generally horizontally projecting arm extending laterally therefrom,
a side wall shaping plate hinged to said lower shaping plate means at a position below the projecting arm of said support plate, said side wall shaping plate including at least one wing forming a frictional contact surface which engages said support plate for maintaining the relative positioning of said side wall shaping plate with respect to said lower shaping plate,
a fixed base having a holder for slidably supporting the projecting arm of said support plate, said holder including screw means for adjusting the height thereof relative to said base, and
guide means extending from said holder to cradle the edge of a pan for rotation thereof against said means for permitting fixed relative rotation of said pan with respect to said shaping plates.

11. A crumb crust shaper comprising
a bottom crust shaping means,
vertical adjustment means for positioning said bottom crust shaping means at variable heights with respect to the bottom of a pan,
a side wall crust shaping means coacting with said bottom crust shaping means and having contact of less than 360° with the inner wall of the crust formed on the inner side of the side wall of a pan, and
guide means for permitting relative rotation between said crust shaping means and a pan.

References Cited

UNITED STATES PATENTS

| | | | |
|---|---|---|---|
| 1,472,022 | 10/1923 | Cockbill et al. | |
| 1,812,893 | 7/1931 | Miller | 25—24 |
| 2,435,052 | 1/1948 | Parrett | 25—24 XR |
| 2,543,682 | 2/1951 | Warfel | 107—47 |
| 2,638,653 | 5/1951 | Adams | 25—24 XR |

WALTER A. SCHEEL, *Primary Examiner.*

ARTHUR O. HENDERSON, *Assistant Examiner.*

U.S. Cl. X.R.

99—439